Aug. 7, 1945.    C. L. EKSERGIAN ET AL    2,381,657
WORK CLAMPING MECHANISM
Original Filed Oct. 8, 1942

INVENTORS:
Carolus L. Eksergian &
Joseph H. Coombes,
BY
John P. Tarbox

Patented Aug. 7, 1945

2,381,657

UNITED STATES PATENT OFFICE 2,381,657

WORK CLAMPING MECHANISM

Carolus L. Eksergian and Joseph H. Coombes, Detroit, Mich., assignors to Budd Wheel Company, Philadelphia, Pa., a corporation of Pennsylvania Original application October 8, 1942, Serial No. 461,357. Divided and this application May 29, 1944, Serial No. 537,890

4 Claims. (Cl. 294—88).

This invention, the application for which is a division of our copending application Serial No. 461,357, filed October 8, 1942, relates to work handling apparatus, particularly to work clamping mechanism.

The primary object of the present invention is to provide work clamping mechanism of new and improved construction and embodying relatively few parts which can be economically manufactured and assembled.

A further object is to provide a work clamping mechanism with clamping jaws capable of gripping a workpiece with considerable pressure and which may be rapidly actuated into and out of clamping position.

With the above and other objects in view which will be apparent from the following description to those skilled in the art to which the invention appertains, the present invention consists in certain features of construction and combinations of parts to be hereinafter described with reference to the accompanying drawing and then claimed.

In the drawing which illustrates a suitable embodiment of the invention,

Figure 1:
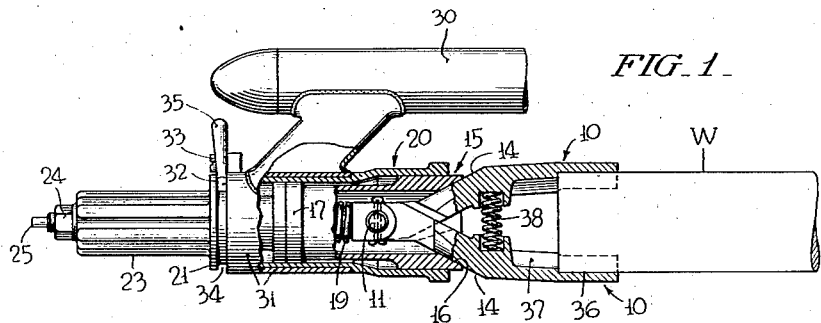
Figure 1 is a side elevation, partly in section, of the work holder.
Figure 2:
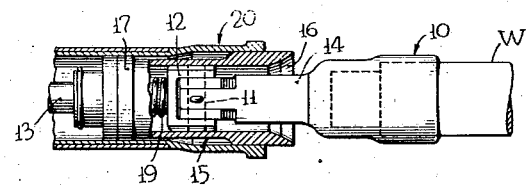
Figure 2 is a horizontal fragmentary section through the work holder, the gripping jaws being shown in plan.
Figure 3:
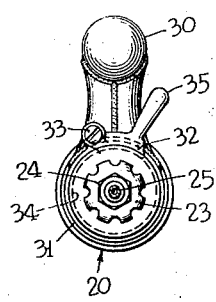
Figure 3 is a rear end elevation of the mechanism shown in Figure 1.

Referring to the drawing, the clamping mechanism of the present invention includes a pair of work gripping jaws 10 pivoted to a common pivot pin 11 which is carried by the yoke end 12 of a rod 13. The jaws 10 adjacent the pivot pin 11 are formed with cam faces 14 which diverge away from the pivot axis.

Surrounding the rod 13 is an elongated sleeve 15 an open end 16 which is chamfered to form an annular cam surface engageable with the cam faces 14, and a closed end 17 through which the rod 13 extends, the end 17 carrying a suitable packing 18 which surrounds the rod 13. Interposed between the closed end 17 and the yoke 12 and surrounding the rod 13 is a coiled compression spring 19 which normally urges the sleeve 15 in a direction away from the jaws 10.

The sleeve 15 is slidable within a cylinder 20 having an end wall 21 through which the rod 13 extends, the rod 13 having a shoulder 22 engaging the wall 21. The end wall 21 also has a rearward extension 23 surrounding the rod 13 and the rod threadably receives a nut 24 engaging the end of the extension 23 to thereby rigidly anchor the rod 13 against axial movement relative to the cylinder 20.

The sleeve 15 has a closely fitting sliding engagement with the cylinder 20 and constitutes a piston. A fluid pressure conduit 25 connects any suitable source of fluid pressure, not shown, to a passage 26 in the rod 13, which passage opens through port 27 into the cylinder space 28 between the end 17 of the sleeve 15 and end 21 of the cylinder 20.

The arrangement described may be supported by any suitable supporting means. In the embodiment shown a support 30 is provided with a cylindrical portion 31 which slidably receives the cylinder 20. The cylinder is held in place in the portion 31 by a locking arm 32 pivoted by screw 33 to the portion 31 to move into and out of a circumferential locking groove 34 in the cylinder 20. A handle 35 is provided for swinging the arm 32 out of the groove 34 to permit removal of the clamping mechanism as a unit from the portion 31.

Upon admission of fluid under pressure through conduit 25 to the space 28, the sleeve 15 is moved forwardly, the cam surface thereof riding against the cam faces 14 of the jaws 10 to pivot the jaws toward each other into clamping position about the workpiece W. Upon release of the fluid under pressure, the spring 19 moves the sleeve 15 rearwardly and a compression spring 38 between the jaws 10 urges the jaws 10 outwardly away from each other.

Figure 4:
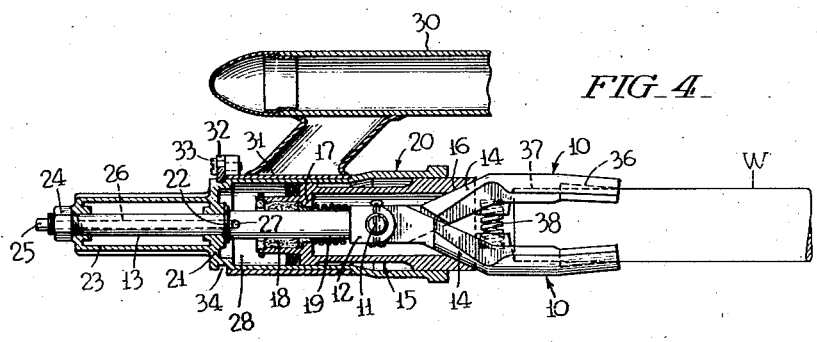
Figure 4 is a view similar to Figure 1, but showing the mechanism in complete longitudinal section and clamping a smaller sized workpiece.

As illustrated, the jaws 10 have two sets of work engaging faces 36 and 37 for gripping different sizes of workpieces. Figure 1 shows the faces 36 in clamping position about a large sized workpiece, whereas Figure 4 shows the faces 37 in clamping position about a smaller sized workpiece.

By removing the nut 24 the jaws and actuating piston or sleeve can be quickly removed from the cylinder 20.

Various changes may be made in the detailed construction and arrangement of the parts described without departing from the spirit and substance of the invention the scope of which is defined by the appended claims.

What is claimed is:

1. Work handling mechanism comprising in combination, a fixed support, a plurality of work clamping jaws carried by said support and movable toward and away from each other, respectively, into and out of work clamping position, said jaws having cam surfaces, a sleeve slidably carried by said support for movement toward and away from and engageable with said cam means, compression spring means resiliently urging said sleeve away from said cam surfaces, and means for moving said sleeve against the resistance of said spring means in the direction of said cam means to move said jaws to work clamping position.

2. Work handling mechanism comprising in combination, a cylinder closed at one end and open at its other end, a rod member within said cylinder and rigidly secured to said closed end, a plurality of work clamping jaws pivoted to said rod member for relative movement into and out of work clamping position and having cam surfaces, a piston slidable in said cylinder and having an annular portion surrounding said cam surfaces, means for moving said piston in a direction toward said cam surfaces to pivot said jaws to work clamping position and means for moving said piston in the opposite direction to free said jaws for pivoting movement out of work clamping position.

3. Work handling mechanism comprising in combination, a fluid pressure cylinder and reciprocable piston therein, certain adjacent ends of said cylinder and piston being closed to form a fluid pressure chamber therebetween, the opposite adjacent ends of said cylinder and piston being open, support within the open end of said piston and fixed relative to said cylinder, a plurality of work clamping jaws pivoted to said support and having cam surfaces engageable by the wall of said piston at the open end thereof, compression spring means urging said piston in a direction away from said jaws and toward the closed end of said cylinder, and compression spring means between said jaws urging said jaws out of work clamping position and into engagement with said piston wall, said piston wall during movement of said piston against the resistance of said first mentioned compression spring means being arranged through said cam surfaces to pivot said jaws to work clamping position.

4. Work handling mechanism comprising in combination, a cylinder closed at one end and open at its other end, a rod member within said cylinder and rigidly secured to said closed end, a plurality of work clamping jaws pivoted to said rod member for relative movement into and out of work clamping position and having cam surfaces, a piston slidable on said rod and within said cylinder, said piston having a skirt portion extending around said jaws and having portions engageable with said cam surfaces, compression spring means urging said piston in a direction away from said cam surfaces, resilient means urging said jaws out of work clamping position with the cam surfaces thereof in engagement with said piston skirt portions, and means for moving said piston toward said jaws against the resistance of said spring means to cause said skirt portions through engagement with said cam surfaces to move said jaws into work clamping position.

CAROLUS L. EKSERGIAN.
JOSEPH H. COOMBES.